July 5, 1927.
L. SADLER
1,635,011
VEHICLE PERISCOPE
Filed Oct. 15, 1925
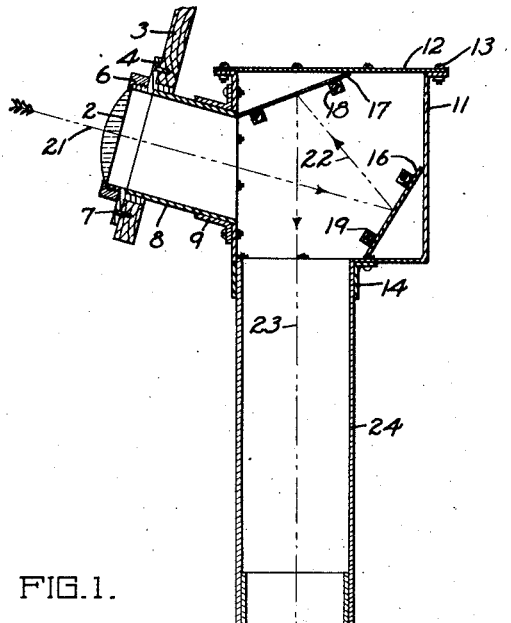
FIG.1.
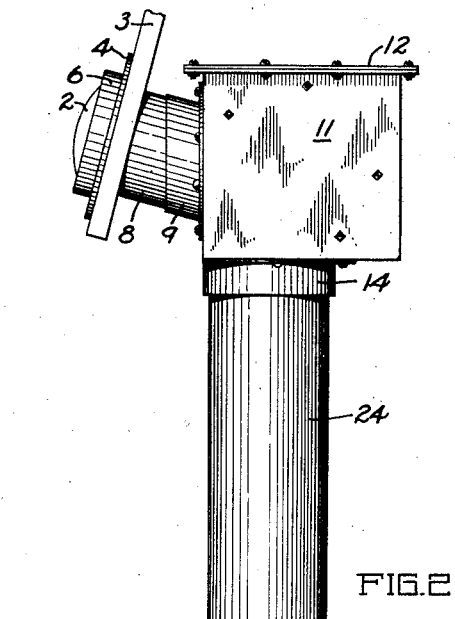
FIG.2.
INVENTOR
LUTHER SADLER
by White Prost
his ATTORNEYS
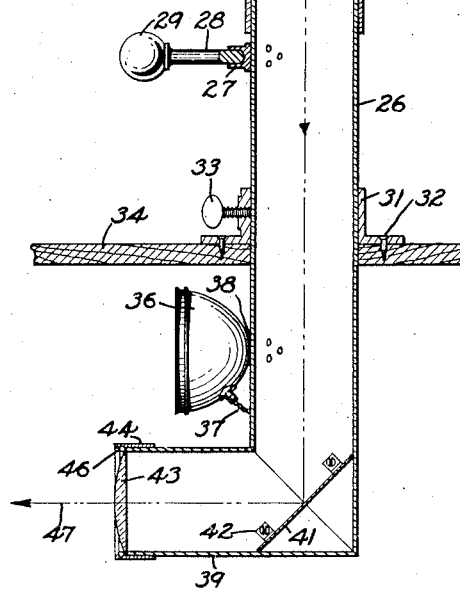
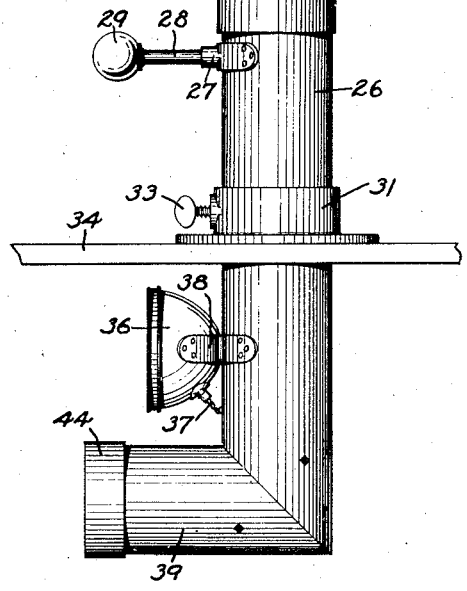

Patented July 5, 1927.

1,635,011

UNITED STATES PATENT OFFICE.

LUTHER SADLER, OF LOS ANGELES, CALIFORNIA.

VEHICLE PERISCOPE.

Application filed October 15, 1925. Serial No. 62,541.

My invention relates to devices for enabling the driver of a vehicle to see to the rear, and especially to such devices which are provided with lights to enable their use at night.

An object of my invention is to provide means for seeing under and behind a vehicle.

A further object of my invention is to provide a periscope which may be used at night as well as in the daytime.

Another object of my invention is to provide a periscope which may be turned to include different fields of vision.

The invention possesses other advantageous features, some of which with the foregoing, will be set forth at length in the following description where I shall outline in full that form of the vehicle periscope of my invention which I have selected for illustration in the drawings accompanying and forming part of the present specification. In said drawings I have shown one form of vehicle periscope embodying my invention, but it is to be understood that I do not limit myself to such form since the invention, as set forth in the claims, may be embodied in a plurality of forms.

In the drawings:

Figure 1 is a cross sectional view of my periscope installed in a vehicle; and

Fig. 2 is a side elevation of my periscope as it is installed in a vehicle.

Broadly speaking, my invention comprises a vehicle periscope which may be directed to different positions in order to include different fields of vision and which is provided with a spot light for illuminating the different fields of vision at night.

My device is especially for use in an automobile to enable the driver thereof to see underneath the car and to the rear of the car without altering his normal driving position. In the preferred form of the invention, an eyepiece is provided on the dash of the automobile and an objective is mounted underneath the floor of the vehicle. A system of mirrors mounted in connecting tubes conducts the line of vision of the driver from the eyepiece to the objective.

The dash 3 of the vehicle is provided with a circular aperture in which a threaded ring 4 is fastened by suitable means, such as the screws 7. A lens or eyepiece 2 is mounted over the end of the ring 4, and is retained in position by means of the clamp 6 screwed to the ring. The ring 4 also serves as a support for a circular tube 8 extending preferably at right angles to the dash of the vehicle and into a mirror chamber 11. The mirror chamber 11 is substantially cubical in form and is supported by means of a flange 9 suitably fastened to the tube 8. A cover 12 is fastened on the mirror chamber 11 by means of the nuts and bolts 13 and is removable to give access to the interior of the chamber in which are mounted a plurality of mirrors. In the present instance, two mirrors 16 and 17 are provided. These mirrors may be of silvered glass or of highly polished metal. The mirrors are retained in place in the mirror chamber at an angle to give a correct reflection of the line of vision by means of angle pieces 18 and 19, affixed to the mirror chamber by means of bolts and nuts. The lower side of the mirror chamber is provided with a flange 14 for supporting a depending casing 24 of substantially circular cross section. Since the casing 24, mirror chamber 11, and tube 8 are all fastened together, they are firmly supported from the dash by means of the ring 4.

A casing 26, of slightly smaller diameter than casing 24, is rotatably and slidably mounted therein and extends below the floor 34 of the vehicle. A flange 31 surrounding the casing 26 is fastened to the floor of the vehicle. It is affixed to the floor by screws 32 or other suitable means and is provided at one side with a wing bolt 33 which may be screwed into or out of frictional engagement with the casing 26. At its lower end, the casing 26 is cut off at an angle and has joined thereto a substantially horizontal tube 39. A lens or objective 43 is seated in the end of the tube 39 and is held in position by means of the ring 44 and the spring retainer 46. A mirror 41, similar to mirrors 16 and 17, is disposed at an angle in the intersection of the casing 26 and tube 39. This mirror is positioned by angle pieces 42 and nuts and bolts similar to those for holding the other mirrors.

To enable the use of the periscope at night, a source of light is provided to illuminate the field of vision. This light source is preferably a spot light 36 of the usual type which is mounted on the lower end of the casing 26 by means of a bracket 38. The electrical connection to the spot light is made by wires 37 leading to a source of electrical energy, not shown.

The end of the casing 26 above the floor of the vehicle is provided with a handle for shifting and rotating the casing together with the spot light mounted on it. The handle comprises a socket 27 attached to the casing 26 and in which is seated a stem 28 having a ball 29 mounted on the outer end thereof.

The driver of a vehicle equipped with my device is enabled, by looking into the eyepiece, to see underneath and behind the car. His line of sight is represented by the line 21 which enters through the eye-piece 2, is reflected from the mirror 16 in the direction of line 22 onto the mirror 17. From there it goes in the direction of line 23 to the mirror 41 from which it is reflected through the objective 43 and thence outwardly, as shown by line 47. It is thus seen that an object in the field of vision of the objective 43 presents an image of itself to the driver of the vehicle which he can see by looking at the eyepiece 2. If the operator wishes to change the field of vision encompassed by the objective, he loosens the wing bolt 33 and manipulates the casing 26 by means of the handle 29. Ordinarily, the friction between casing 26 and casing 24 will be sufficient to retain the objective in position, but the wing bolt 33 is provided to clamp the casing 26 in place. It will be appreciated that the objective 43 may be rotated through a complete circle and may be raised and lowered with perfect freedom, thus bringing into the field of vision whatever the operator desires. The spot light 36, being mounted on and dirigible with the casing 26 renders the periscope useful at night, for it casts a beam of light into the field of vision of the objective.

While I have described my periscope as attached to an automobile and disposed so as to disclose a field of vision below the vehicle, it is to be understood that the periscope can be installed equally well in other positions and to give other fields of vision.

I claim:

1. In a vehicle having a floor and a dash, an eyepiece tube mounted horizontally in said dash, an eyepiece mounted in said tube and disposed on one side of said dash, a mirror chamber communicating with said tube and disposed on the other side of said dash, a plurality of mirrors in said mirror chamber, a vertical tube communicating with said mirror chamber and extending below said floor, said vertical tube being provided with a telescopic joint, a mirror in the lower end of said vertical tube, a horizontal objective tube communicating with said vertical tube at the lower end thereof, an objective disposed in said objective tube, a spot light mounted on said objective tube, and a handle for directing said objective and said spot light.

2. A vehicle periscope comprising a mirror chamber, mirrors on adjacent walls of said chamber, a tube opposite one of said mirrors and opening at one end into said chamber, an eyepiece mounted in the other end of said tube, a casing opposite another of said mirrors and opening at one end into said chamber, a second casing slidably and rotatably mounted in the other end of said first casing, a second tube having one end mounted on and intersecting said second casing at an angle, an objective mounted in the other end of said second tube, a mirror mounted in the intersection of said second tube in said second casing, a handle on said second casing for moving said second casing with respect to said first casing, and a spot light mounted on and movable with said second casing.

In testimony whereof, I have hereunto set my hand.

LUTHER SADLER.